United States Patent
Böckh et al.

[11] Patent Number: 6,165,969
[45] Date of Patent: Dec. 26, 2000

[54] USE OF QUATERNIZED POLYMERIZATES CONTAINING UNITS OF VINYL IMIDAZOL AS A COLOR FIXING AND COLOR TRANSFER INHIBITING ADDITIVE TO DETERGENT POST-TREATMENT AGENTS AND DETERGENTS

[75] Inventors: Dieter Böckh, Limburgerhof; Hans-Ulrich Jäger, Neustadt; Jürgen Alfred Lux, Niederkirchen; Stefan Stein, Saulheim; Jürgen Detering, Limburgerhof; Christian Schade, Ludwigshafen, all of Germany

[73] Assignee: BASF Aktiengesellschaft, Ludwigshafen, Germany

[21] Appl. No.: 09/284,967
[22] PCT Filed: Oct. 28, 1997
[86] PCT No.: PCT/EP97/05939
§ 371 Date: May 5, 1999
§ 102(e) Date: May 5, 1999
[87] PCT Pub. No.: WO98/21301
PCT Pub. Date: May 22, 1998

[30] Foreign Application Priority Data

Nov. 11, 1996 [DE] Germany .......................... 196 46 437

[51] Int. Cl.$^7$ .................................................. C11D 10/00
[52] U.S. Cl. ........................................... 510/475; 510/303
[58] Field of Search ..................... 510/475, 303

[56] References Cited

U.S. PATENT DOCUMENTS

| | | | |
|---|---|---|---|
| 5,500,153 | 3/1996 | Figueroa et al. | 252/548 |
| 5,622,926 | 4/1997 | Schade et al. | 510/340 |
| 5,627,151 | 5/1997 | Detering et al. | 510/475 |
| 5,710,118 | 1/1998 | Busch et al. | 510/360 |
| 5,710,119 | 1/1998 | Busch et al. | 510/360 |
| 5,773,545 | 3/1996 | Schade et al. | 526/262 |
| 5,804,543 | 9/1998 | Wertz et al. | 510/303 |
| 5,846,924 | 12/1998 | Detering et al. | 510/475 |

FOREIGN PATENT DOCUMENTS

| | | | |
|---|---|---|---|
| 22 32 353 | 1/1973 | Germany . | |
| 28 14 287 | 10/1979 | Germany . | |
| 4027832 | 3/1992 | Germany | C11D 17/08 |
| 4235798 | 4/1994 | Germany | C11D 3/37 |
| 1 348 212 | 3/1974 | United Kingdom . | |

Primary Examiner—Yogendra Gupta
Assistant Examiner—Christine Ingersoll
Attorney, Agent, or Firm—Oblon, Spivak, McClelland, Maier & Neustadt, P.C.

[57] ABSTRACT

The use of polymers which comprise at least 5 mol % of quaternized 1-vinylimidazole units of the formula

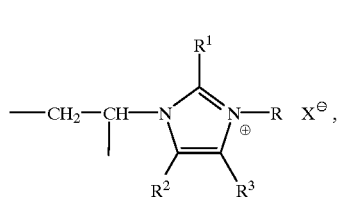

(I)

where

R is $C_1$–$C_{25}$-alkyl, $C_5$–$C_{10}$-cycloalkyl or benzyl $R^1, R^2, R^3$ are identical or different and are H, $CH_3$ and $C_2H_5$, and $X^\ominus$ is an anion, as color-fixing and color transfer-inhibiting additive to laundry aftertreatment aids and to detergents.

11 Claims, No Drawings

USE OF QUATERNIZED POLYMERIZATES CONTAINING UNITS OF VINYL IMIDAZOL AS A COLOR FIXING AND COLOR TRANSFER INHIBITING ADDITIVE TO DETERGENT POST-TREATMENT AGENTS AND DETERGENTS

The invention relates to the use of polymers which comprise at least 5 mol % of quaternized, unsubstituted or substituted vinylimidazole units, as color-fixing and color transfer-inhibiting additive to laundry aftertreatment aids and to detergents.

When colored textiles are washed, the dye is partly removed from the colored textiles and transferred from the wash liquor to other fabrics. If, for example, white laundry is washed together with colored textiles, the white laundry is stained. Color detergents which comprise polymeric color transfer inhibitors were developed to prevent transfer of the removed textile dye from the wash liquor to the laundry. These inhibitors are, for example, homo- and copolymers of vinylpyrrolidone and vinylimidazole, cf. DE-B-22 32 353 and DE-A-28 14 287.

WO-A-94/10281 discloses the use of copolymers of
(a) 1-vinylpyrrolidone and/or 1-vinylimidazole and
(b) nitrogenous, basic ethylenically unsaturated monomers in the form of the free bases, of the salts or in quaternized form as additive to detergents to inhibit dye transfer during the washing process.

Polymers of alkyl-1-vinylimidazoles and processes for preparing them by free-radical polymerization of alkyl-1-vinylimidazoles, in the presence or absence of other monomers, in water or $C_1$–$C_4$-alcohols are disclosed in WO-A-95/15345. The polymers obtainable in this way are used as additive to detergents to inhibit dye transfer during the washing process.

EP-A-0 462 806 discloses the use of cationic dye fixatives in laundry aftertreatment baths together with fabric softeners. The aftertreatment of the laundry takes place in the washing machines normally used in the household at below 40° C. The dye fixatives can, according to the statements in the application, also be employed in nonionic detergents. The cationic fixatives retard removal of the dye from the colored textiles during the treatment process.

It is an object of the present invention to provide other compositions for suppressing dye removal and dye transfer to other textiles during washing and during the aftertreatment of colored textiles.

We have found that this object is achieved by the use of polymers which comprise at least 5 mol % of quaternized 1-vinylimidazole units of the formula

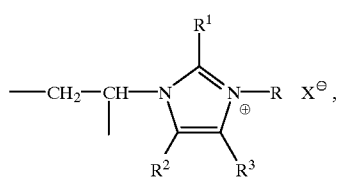

(I)

where
R is $C_1$–$C_{25}$-alkyl, $C_5$–$C_{10}$-cycloalkyl or benzyl
$R^1, R^2, R^3$ are identical or different and are H, $CH_3$ and $C_2H_5$, and
$X^\ominus$ is an anion, as color-fixing and color transfer-inhibiting additive to laundry aftertreatment aids and to detergents.

The polymers to be used according to the invention usually comprise at least 10 mol % of quaternized 1-vinylimidazole units of the formula I and have a molecular weight of from 5000 to 1 million. The polymers preferably employed comprise from 20 to 100 mol % of quaternized 1-vinylimidazole units of the formula I and have a molecular weight of from 10000 to 500000 (determined by light scattering).

The polymers to be employed according to the invention can be obtained by free-radical polymerization of quaternary 1-vinylimidazoles of the formula II

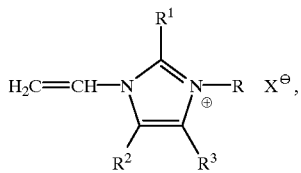

(II)

where
R is $C_1$–$C_{25}$-alkyl, $C_5$–$C_{10}$-cycloalkyl or benzyl, $R^1, R^2, R^3$ are identical or different and are H, $CH_3$ and $C_2H_5$, and
$X^\ominus$ is an anion, preferably Cl—, Br—, I—, $CH_3OSO_3$— or $C_2H_5OSO_3$— in the presence or absence of other monoethylenically unsaturated monomers.

Examples of such monomers are
1-vinyl-2-methyl-3-benzylimidazolium chloride,
1-vinyl-2,4-dimethyl-3-benzylimidazolium chloride,
1-vinyl-2,4,5-trimethyl-3-benzylimidazolium bromide,
1-vinyl-2,4,5-trimethyl-3-ethylimidazolium chloride,
1-vinyl-2-ethyl-3-benzylimidazolium chloride,
1-vinyl-4,5-diethyl-3-methylimidazolium chloride and
1-vinyl-2,4,5-triethyl-3-benzylimidazolium chloride.

The polymers to be used according to the invention can also be obtained by quaternizing polymers which comprise 1-vinylimidazole units of the formula

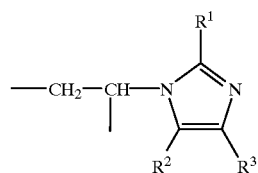

(III)

where $R^1, R^2, R^3$ are identical or different and are H, $CH_3$ and $C_2H_5$, with $C_1$–$C_{25}$-alkylating agents. Polymers of this type are described, for example, in WO-A-94/10281 and WO-A-94/14861.

Examples of suitable quaternizing agents are alkyl halides such as the preferably used $C_1$–$C_{25}$-alkyl chlorides or alkyl bromides, $C_5$–$C_{10}$-cycloalkyl halides or benzyl chloride or benzyl bromide. Examples of suitable alkylating agents are methyl chloride, ethyl chloride, methyl bromide, ethyl bromide, propyl chloride, n-propyl bromide, isopropyl chloride, butyl chloride, hexyl chloride, cyclohexyl chloride, octyl chloride, dodecyl chloride and stearyl chloride. $C_1$–$C_{12}$-Alkyl chlorides or alkyl bromides, and benzyl chloride or benzyl bromide, are preferably used as quaternizing agents.

Further suitable alkylating agents are dialkyl sulfates and alkyl sulfonates. Examples of suitable dialkyl sulfates are dimethyl sulfate and diethyl sulfate. Examples of suitable alkyl sulfonates are methyl methylsulfonate and methyl toluenesulfonate. Dimethyl sulfate and diethyl sulfate are preferred alkylating agents.

Examples of quaternized 1-vinylimidazoles of the formula II are 3-methyl-1-vinylimidazolium chloride, 3-benzyl-1-vinylimidazolium chloride, 3-ethyl-1-vinylimidazolium sulfate, 3-n-dodecyl-1-vinylimidazolium bromide and 3-n-octadecyl-1-vinylimidazolium chloride.

The polymers which are preferably employed comprise units of the formula I where $R^1$, $R^2$, $R^3$=H and R is methyl, ethyl or benzyl. They comprise, for example, (a) 25 to 100 mol % of quaternary vinylimidazoles of the formula II, (b) 0 to 75 mol % of 1-vinylpyrrolidone, vinyloxazolidone, N-vinylcaprolactam, N-vinylamides of $C_1$–$C_8$-carboxylic acids, acrylonitrile, vinyl esters of $C_1$–$C_{10}$-carboxylic acids, acrylic esters and methacrylic esters of $C_1$–$C_{20}$-alcohols or mixtures of said monomers and (c) 0 to 30 mol % of other monoethylenically unsaturated monomers as copolymerized units.

Particularly preferred copolymers are those which comprise (a) 40 to 100 mol % of quaternary vinylimidazoles of the formula II and (b) 0 to 60 mol % of 1-vinylpyrrolidone, N-vinylformamide, N-vinylcaprolactam, vinyl acetate, vinyl propionate, methyl acrylate or mixtures of said monomers as copolymerized units. If the monomers of component (b) are present in the polymers, their content is preferably 20 to 50 mol %.

(c) Examples of suitable monomers (c) are monoethylenically unsaturated carboxylic acids such as acrylic acid, methacrylic acid, fumaric acid, maleic acid, maleic anhydride, itaconic acid, itaconic anhydride. Other suitable comonomers are hydroxyethyl acrylate, hydroxyethyl methacrylate, hydroxypropyl acrylate, hydroxypropyl methacrylate, hydroxybutyl acrylate, hydroxybutyl methacrylate, phenoxyethyl acrylate, dimethylaminoethyl acrylate, dimethylaminoethyl methacrylate, diethylaminoethyl (meth)acrylate, methoxyethyl acrylate.

Further suitable monomers are: (meth)acrylamide, N-methylol(meth)acrylamide, N-substituted (meth) acrylamides such as N-methyl(meth)acrylamide, N-t-butylacrylamide, diallyldimethylammonium chloride, diallyldiethylammonium chloride, dimethylaminopropylmethacrylamide, diethylaminopropylmethacrylamide, styrene, methylstyrene, vinyl alkyl ethers such as vinyl methyl ether, vinyl ethyl ether, vinyl propyl ether, styrenesulfonate, vinylsulfonate, 2-sulfoethyl methacrylate and 2-acrylamido-2-methylpropanesulfonic acid.

The polymers comprising quaternized vinylimidazole units of the formula I are employed, for example, in amounts of from 0.05 to 2.5, preferably 0.1 to 1.5, % by weight in detergents which comprise less than 4% by weight of an anionic surfactant. The polymers preferably used in detergent formulations containing anionic surfactants comprise units of the formula I where $R^1$, $R^2$, $R^3$=H and R is $C_1$–$C_{22}$-alkyl or benzyl and X is an anion. The polymers comprising quaternized 1-vinylimidazole units of the formula I to be used according to the invention are preferably employed in detergents containing no anionic surfactants. Detergent formulations of these types comprise, for example, (i) 1 to 50% by weight of at least one nonionic surfactant, (ii) 0 to 4.0% by weight, preferably up to 2.5%, of an anionic surfactant and (iii) 0.05 to 2.5% by weight of at least one polymer which comprises at least 5 mol % of quaternized 1-vinylimidazole units of the formula I.

Examples of suitable nonionic surfactants (I) are alkoxylated $C_8$–$C_{22}$-alcohols. The alkoxylation can be carried out with ethylene oxide, propylene oxide and/or butylene oxide. The surfactants which can be employed in this connection are all alkoxylated alcohols which comprise at least two molecules of an abovementioned alkylene oxide in the adduct. Said alkylene oxide adducts can be block copolymers of ethylene oxide, propylene oxide and/or butylene oxide or adducts which contain said alkylene oxides in random distribution. The nonionic surfactants comprise, per mole of alcohol, for example 2 to 50, preferably 3 to 20 mol of at least one alkylene oxide in the adduct. Ethylene oxide is preferably employed as alkylene oxide. The alcohols are preferably derived from compounds having 10 to 18 carbon atoms. These can be natural or synthetic alcohols.

Another class of nonionic surfactants comprises alkyl polyglucosides having 8 to 22, preferably 10 to 18, carbon atoms in the alkyl chain. These compounds comprise, for example, 1 to 20, preferably 1.1 to 5, glucoside units.

Another class of nonionic surfactants comprises N-alkylglucamides of the structure I or II

where A is $C_6$–$C_{22}$-alkyl, B is H or $C_1$–$C_4$-alkyl and C is a polyhydroxyalkyl radical having 5 to 12 carbon atoms and at least 3 hydroxyl groups. It is preferred for A to be $C_{10}$–$C_{18}$-alkyl, B to be $CH_3$ and C to be a $C_5$ or $C_6$ radical. Compounds of this type are obtained, for example, by the acylation of reductively aminated sugars with chlorides of $C_{10}$–$C_{18}$-carboxylic acids. The detergent formulations contain $C_{10}$–$C_{18}$-alcohols preferably ethoxylated with 3–12 mol of ethylene oxide, particularly preferably ethoxylated fatty alcohols, as nonionic surfactants.

Further suitable and preferred surfactants are the endgroup-capped fatty amide alkoxylates, disclosed in WO-A-95/11225, of the formula

where $R^1$ is $C_5$–$C_{21}$-alkyl or -alkenyl, $R^2$ is $C_1$–$C_4$-alkyl,

A is $C_2$–$C_4$-alkylene, n is 2 or 3, and x has a value from 1 to 6.

Examples of such compounds are the products of the reaction of n-butyltriglycolamine of the formula $H_2N$—$(CH_2$—$CH_2$—$O)_3$—$C_4H_9$ with methyl dodecanoate or the products of the reaction of ethyltetraglycolamine of the formula H$_2$N—(CH$_2$—CH$_2$—O)$_4$—C$_2$H$_5$ with a commercial mixture of saturated C$_8$–C$_{18}$-fatty acid methyl esters.

The powder or granular detergents may additionally contain one or more builders. Examples of suitable inorganic builder substances are all the conventional inorganic builders such as aluminosilicates, silicates, carbonates and phosphates.

Examples of suitable inorganic builders are aluminosilicates with ion-exchanging properties such as zeolites. Various types of zeolites are suitable, in particular zeolites A, X, B, P, MAP and HS in their Na form or in forms in which Na is partly replaced by other cations such as Li, K, Ca, Mg or ammonium. Suitable zeolites are described, for example, in EP-A-0 038 591, EP-A-0 021 491, EP-A-0 087 035, U.S. Pat. No. 4,604,224, GB-A-2 013 259, EP-A-0 522 726, EP-A-0 384 070 and WO-A-94/24251.

Examples of other suitable inorganic builders are amorphous or crystalline silicates such as amorphous disilicates, crystalline disilicates such as the sheet silicate SKS-6 (manufactured by Hoechst AG). The silicates can be employed in the form of their alkali metal, alkaline earth metal or ammonium salts. Na, Li and Mg silicates are preferably employed.

Further suitable inorganic builder substances are carbonates and bicarbonates. These can be employed in the form of their alkali metal, alkaline earth metal or ammonium salts. Na, Li and Mg carbonates and bicarbonates, in particular sodium carbonate and/or sodium bicarbonate, are preferably employed.

The inorganic builders can be present in the detergents in amounts of from 0 to 60% by weight, together with organic cobuilders to be used where appropriate. The inorganic builders can be incorporated either alone or in any combination with one another into the detergent.

Powder or granular or other solid detergent formulations comprise organic cobuilders in amounts of from 0 to 20% by weight, preferably in amounts of from 1 to 15% by weight, together with inorganic builders. Powder or granular heavy-duty detergents may additionally contain other conventional ingredients such as bleaching systems consisting of at least one bleach, where appropriate combined with a bleach activator and/or a bleach catalyst, and other conventional ingredients such as soil release polymers, antiredeposition agents, enzymes, inorganic fillers such as sodium sulfate, complexing agents, optical brighteners, dyes, perfume oils, foam suppressants, corrosion inhibitors, phosphates and/or phosphonates in the usual amounts.

The detergents preferably contain no anionic surfactants but may comprise them as component (ii) in amounts of up to 4% by weight, preferably up to 2.5% by weight. Examples of suitable anionic surfactants are sulfates of fatty alcohols having 8 to 22 carbon atoms, sulfated, ethoxylated C$_8$–C$_{22}$-alcohols and their water-soluble alkali metal and ammonium salts. Further suitable anionic surfactants are alkylsulfonates such as C$_8$–C$_{24}$-alkanesulfonates, soaps such as the alkali metal salts of C$_8$–C$_{24}$-carboxylic acids, and N-acylsarcosinates with C$_8$–C$_{24}$-acyl radicals. Also suitable as anionic surfactants are linear C$_9$–C$_{20}$-alkylbenzenesulfonates (LAS). The anionic surfactants may also be employed, for example, in the form of the hydroxyethylammonium, di(hydroxyethyl)ammonium and tri(hydroxyethyl)ammonium salts. Preferably employed if the detergents according to the invention comprise anionic surfactants are soaps, acylsarcosinates or sulfated ethoxylated C$_8$–C$_{22}$-alcohols.

The detergents contain according to the invention as component (iii) 0.05 to 2.5, preferably 0.1 to 1.5, % by weight of at least one of the quaternized polymers described above having at least 5 mol % of units of the formula I.

The quaternized polymers to be used according to the invention not only have a color transfer-inhibiting effect when colored textiles are washed together with uncolored textiles but, surprisingly, also have a color-fixing effect. This means that the removal of dyes from colored textiles during the washing process is not as great as on use of other color transfer inhibitors such as polymers of N-vinylpyrrolidone.

Polymers comprising at least 5 mol % of quaternized 1-vinylimidazole units of the formula I have a pronounced color-fixing effect and, moreover, act as color transfer inhibitors in laundry aftertreatment and care aids. The polymers comprising quaternized vinylimidazole units of the formula I are therefore advantageously employed in afterwash treatment compositions. Laundry aftertreatment aids comprise, for example, (i) 1 to 50% by weight of a fabric softener for laundry,
(ii) 1 to 50% by weight of a nonionic surfactant and
(iii) 0.1 to 2.5% by weight of polymer comprising at least one quaternized 1-vinylimidazole unit of the formula I in an amount of at least 5 mol %.

The laundry aftertreatment aids preferably comprise as component (i) 2.5 to 30% by weight of a fabric softener for laundry. Examples of suitable fabric softeners are quaternary ammonium compounds, polysiloxanes and nonionic cellulose ethers, cf., for example, EP-A-0 239 910, EP-A-0 150 867 and EP-A-0 213 730. Examples of fabric softeners for laundry are dialkyldimethylammonium chlorides and alkylimidazolium methyl sulfates.

The laundry aftertreatment aids comprise as component (ii) for example 1 to 50, preferably 2 to 20, % by weight of a nonionic surfactant. Nonionic surfactants have been described above as component (i) in the composition of the detergents. The compounds mentioned there can likewise be employed in laundry aftertreatment aids. The laundry aftertreatment aids comprise as component (iii) 0.1 to 2.5, preferably 0.2 to 2.0, % by weight of a quaternary polymer as color-fixing and color transfer-inhibiting additive.

The polymers to be used according to the invention achieve a maximum effect, for example in a formulation containing no anionic surfactants, at a concentration as low as from 20 to 100 ppm in the wash liquor or the liquor of the laundry aftertreatment aid. A further increase in the amount of the polymers used normally results in only a small further increase in the effectiveness.

Unless otherwise evident from the context, the percentage data in the examples are % by weight. The K values were determined by the method of H. Fikentscher, Cellulose-Chemie, 13 (1932) 58–65 and 71–74 at 25° C. and with a polymer concentration of 1% by weight in 0.5 molar aqueous NaCl solution.

The following quaternary polymers were used:

Polymer 1

Copolymer of 1-vinylimidazole and 1-vinylpyrrolidone in the molar ratio 55:45 which was quaternized by reaction with dimethyl sulfate to give a terpolymer with units of 1-vinylimidazole, 1-vinyl-3-methylimidazolinium methosulfate and 1-vinylpyrrolidone in the molar ratio 45:10:45. The quaternary polymer had a K value of 34.7.

Polymer 2

Copolymer of 1-vinylimidazole and 1-vinylpyrrolidone in the molar ratio 60:40, which was quaternized by reaction with dimethyl sulfate to give a terpolymer which comprised units of 1-vinylimidazole, 1-vinyl-3-methylimidazolium methosulfate and 1-vinylpyrrolidone in the molar ratio 40:20:40. The quaternized polymer had a K value of 34.8.

Polymer 3

Copolymer of 1-vinylimidazole and 1-vinylpyrrolidone in the molar ratio 55:45, which was quaternized by reaction with dimethyl sulfate and benzyl chloride to give a polymer which comprised units of 1-vinylimidazole, 1-vinyl-3-methylimidazolium chloride, 1-vinyl-3-benzylimidazolium chloride and 1-vinylpyrrolidone in the molar ratio 45:5:5:45. The polymer had a K value of 83.3.

Polymer 4

Homopolymer of 1-vinylimidazole with a K value of 23, which was converted by reaction with benzyl chloride in the molar ratio 1:1 into poly-(N-benzyl)vinylimidazolium chloride.

Polymer 5

Copolymer of 1-vinylimidazole and 1-vinylpyrrolidone in the molar ratio 1:1 with a K value of 17, which was quaternized by reaction in aqueous solution with 1 mol of benzyl chloride per mole of 1-vinylimidazole to give a copolymer which comprised units of N-benzylvinylimidazolium chloride and 1-vinylpyrrolidone in the molar ratio 1:1.

EXAMPLES

Use in a fabric softener:

To test the color removal-reducing and color transfer-inhibiting effect, the polymers to be used according to the invention were added to a commercial laundry fabric softener. The colored fabric was prerinsed with an aqueous solution of the fabric softener at 25° C., rinsed again with tap water, dried and ironed. Subsequently, the pretreated colored fabrics were washed together with white test fabrics using a commercial detergent. The color strength of the white test fabrics compared with the previously measured color strength was determined by the method of A. Kud, Seifen, Öle, Fette, Wachse 119 (1993) 590–594. The color strengths of each of the stains on the white fabric were determined, and the color transfer-inhibiting effect of the polymers was determined therefrom. To test the loss of color from the colored test fabric, the treatment with fabric softener, subsequent washing and drying was repeated 5 times with the same colored fabric. The loss of color was determined from the color strength of the colored fabric before the first wash and the color strength after the 5th wash using the following formula:

$$\text{Loss of color}[\%] = \frac{\text{Color strength}_{\text{(before wash)}} - \text{Color strength}_{\text{(after wash)}}}{\text{Color strength}_{\text{(before wash)}}} * 100.$$

Test conditions:

Apparatus: Launder-O-meter

Colored fabric: 1.0 g of cotton fabric colored with 0.8% Direct Blue 71

White fabric: 2.5 g of cotton fabric

Pretreatment:

Fabric softener: Softlan® (manufactured by Colgate-Palmolive) Concentration of the polymers used in the fabric softener: 2.0% Amount of fabric softener used: 1.75 g/l Temperature (rinsing): 30° C. Rinsing time: 10 min Washing:

Detergent: Ajax® (manufactured by Colgate-Palmolive)

Amount: 5.0 g/l

Amount of liquor: 250 g

Washing temperature: 40° C.

Water hardness: 14.5° German hardness

Ca/Mg ratio: 4.0:1.0

Washing time: 30 min.

TABLE 1

Results of tests on the color transfer inhibition and the reduction in the loss of color with Direct Red 212 on cotton

| Polymer | Amount in Softlan fabric softener [%] | Loss of color [%] | Color transfer inhibition [%] |
|---|---|---|---|
| Ex. | | | |
| 1  Polymer 1 | 2 | 18.3 | 85.2 |
| 2  Polymer 2 | 2 | 18.4 | 86.9 |
| 3  Polymer 3 | 2 | 16.8 | 85.6 |
| Comparative Example | | | |
| 1  none | — | 25.1 | 0 |
| 2  PVP[1] | 2 | 25.1 | 48.5 |
| 3  VI/VP[2] copolymer | 2 | 26.3 | 76.0 |

[1] PVP = Poly-N-vinylpyrrolidone
[2] VI/VP = 1-Vinylimidazole/1-vinylpyrrolidone The results with the polymers to be used according to the invention show that the polymers show, on addition to a commercial fabric softener, a better color transfer-inhibiting effect than on addition of polyvinylpyrrolidone with a molecular weight of 40000 or VI/VP copolymer with a molecular weight of 10000. In addition, the removal of color from the colored fabrics is distinctly reduced, and thus there is a distinct decrease in the fading of colored textiles on washing.

To test the polymers according to the invention in detergent formulations, the color transfer-inhibiting and color removal-reducing effect was tested in various heavy-duty detergents and color detergents (Tables 2 and 3). In the formulation examples, the polymers according to the invention show a distinct reduction in the color transfer and distinctly less color removal than on use of commercial color transfer inhibitors such as PVP, VI/VP copolymers or poly-4-vinylpyridine N-oxide.

TABLE 2

| | I | II | III | IV | V | VI | VII |
|---|---|---|---|---|---|---|---|
| Polymer 1 | 1.5 | | 1.0 | 0.5 | | 0.6 | 0.3 |
| Polymer 2 | | 1.0 | | | | | |
| Polymer 3 | | | | | 1.0 | | |
| AA/MA (70000) | 7.5 | | 5.0 | | 5.0 | | |
| AA/MA/VAc terpolymer (40000) | | | | | | 5.0 | |
| Na perborate monohydrate | 15 | 15 | | | 15 | | 7.5 |
| Na percarbonate | | | 18 | 15 | | 18 | |
| TAED | 4.0 | 3.8 | 5.0 | 5.0 | 2.9 | 4.2 | 2.0 |
| Na lauryl sulfate | | | | 1.0 | | | |
| linear Na alkyl-benzenesulfonate | | | 0.8 | | | | |
| Sulfated fatty alcohol ethoxylate | | | | | | 1.5 | |
| Commercial oleyl-sarcosinate in the acid form | 3.1 | | | | | 2.0 | |
| Soap | | | | 0.4 | 2.5 | 1.5 | 2.4 |
| $C_{13}/C_{15}$ oxo alcohol*3 EO | | 3.0 | | | | | |

TABLE 2-continued

|  | I | II | III | IV | V | VI | VII |
|---|---|---|---|---|---|---|---|
| $C_{13}/C_{15}$ oxo alcohol*7 EO | 7.5 |  | 4.7 | 18.5 | 8.0 | 6.5 |  |
| $C_{13}/C_{15}$ oxo alcohol*10 EO |  | 3.0 |  |  |  |  |  |
| $C_{12}/C_{14}$ fatty alcohol*7 EO |  |  |  |  |  |  | 10.0 |
| Lauryl alcohol*13 EO |  |  |  |  |  | 5.0 |  |
| Zeolite A | 25 | 25 | 15 |  | 30 | 15 | 35 |
| Zeolite P |  |  |  | 40 |  |  |  |
| SKS-6 |  |  | 14 |  |  | 15 |  |
| Na disilicate | 2.5 | 3.9 |  | 0.5 | 4.5 |  | 1.5 |
| Mg silicate | 1.0 |  | 0.8 |  | 1.0 | 1.0 | 0.6 |
| Sodium sulfate | 2.0 | 2.5 | 15.2 | 2.0 | 1.5 | 5.5 | 3.4 |
| Sodium bicarbonate |  |  | 9.0 | 6.5 |  |  |  |
| Sodium carbonate | 12.0 | 13.6 |  |  | 10.0 | 8.0 | 9.8 |
| Soil-release polymer |  | 0.4 |  |  | 0.5 |  |  |
| Polyethylene terephthalate/ oxyethylene terephthalate | 1.0 |  |  |  | 0.5 | 0.8 | 1.0 |
| Carboxymethyl-cellulose | 0.6 | 1.3 | 0.6 | 1.0 | 0.6 | 0.6 | 0.5 |
| Dequest ® 2046 (phosphonate) |  |  |  | 0.5 |  |  |  |
| Citric acid |  | 6.8 | 5.0 |  |  | 2.5 | 3.8 |
| Lipase |  |  |  |  | 1.0 |  |  |
| Protease |  | 1.0 |  |  | 1.0 | 0.5 | 0.6 |
| Cellulase |  |  |  |  |  |  | 0.6 |
| Water | to 100 | to 100 | to 100 | to 100 | to 100 | to 100 | to 100 |

Abbreviations:
TAED Tetraacetylethylenediamine
SKS-6 Sheet silicate Na salt (manufactured by Hoechst)
EO Ethylene oxide
AA/MA (70000) = Acrylic acid/maleic acid copolymer in the ratio 70:30 by weight, molecular weight $M_w$ = 70,000
AA/MA/VAc (40000) = Acrylic acid/maleic acid/vinyl acetate terpolymer in the molar ratio 40:10:50 with molecular weight $M_w$ = 40,000
Soil-release polymer commercial graft copolymer of vinyl acetate on polyethylene glycol Table 4 indicates the composition of color detergents which contain the cationic condensates to be used according to the invention.

TABLE 3

|  | VII | VIII | IX | X | XI | XII |
|---|---|---|---|---|---|---|
| Polymer 1 | 1.0 | 1.0 | 0.5 | 1.0 | 0.5 | 0.3 |
| AA/MA (70000) | 6.0 | 4.0 | 3.5 | 2.0 | 2.5 | 8.5 |
| Na lauryl sulfate |  |  | 1.0 |  |  |  |
| Linear Na alkylbenzene-sulfonate |  |  |  |  |  | 0.5 |
| Sulfated fatty alcohol ethoxylate |  |  |  | 1.5 |  |  |
| Commercial oleylsarcosinate in the acid form |  |  |  |  | 2.0 |  |
| Soap | 2.5 |  | 1.0 | 1.5 | 1.5 |  |
| $C_{13}/C_{15}$ oxo alcohol*3 EO |  | 10.0 |  |  | 1.5 |  |
| $C_{13}/C_{15}$ oxo alcohol*7 EO | 6.7 |  | 16.0 | 13.5 | 14.0 | 7.5 |
| $C_{13}/C_{15}$ oxo alcohol*10 EO |  | 6.3 |  |  |  |  |
| Lauryl alcohol*13 EO |  |  |  | 2.0 |  | 9.0 |
| Zeolite A | 28 | 55 | 35 |  | 37 | 18 |
| Zeolite P |  |  |  | 36 |  |  |
| SKS-6 |  |  | 12 |  |  |  |
| Na disilicate | 4.5 |  |  | 0.5 | 4.5 |  |
| Mg silicate | 1.0 |  | 1.0 |  | 1.0 | 1.0 |
| Sodium sulfate | 24 | 5.8 | 11.5 | 8.0 | 4.5 | 10.0 |
| Sodium bicarbonate |  |  | 6.5 | 6.5 |  |  |
| Sodium carbonate | 12.0 | 6.0 |  |  | 10.0 | 9.0 |
| Carboxymethylcellulose | 0.6 | 0.5 | 0.6 | 1.0 | 0.6 | 0.6 |
| Sokalan ® HP 22 | 1.0 |  |  |  |  | 0.5 |
| Polyethylene terephthalate/ oxyethylene terephthalate |  |  | 1.0 | 0.5 |  | 0.5 |

TABLE 3-continued

|  | VII | VIII | IX | X | XI | XII |
|---|---|---|---|---|---|---|
| Sodium citrate | 2.0 | 9.0 |  |  |  | 2.5 |
| Protease | 0.5 |  |  |  |  | 1.0 |
| Cellulase | 1.0 |  | 1.0 |  | 0.8 | 1.0 |
| Water | to 100 | to 100 | to 100 | to 100 | to 100 | to 100 |

For abbreviations, see legend to Table 2

The effect of polymers 4 and 5 in a detergent composition with a low anionic surfactant content is illustrated in the following examples. The test conditions chosen for this were as follows:

Apparatus: Launder-O-meter
Colored fabric: 1.0 g of cotton fabric colored with 0.8% Direct Blue 71
White fabric: 2.5 g of cotton fabric
Detergent composition in % (detergent A)
$C_{13/15}$ oxo alcohol *7 EO 15.0
Zeolite A 50.0
Sodium carbonate 10.0
Sodium citrate 9.0
Sulfated $C_{12/14}$ fatty alcohol ethoxylate *3 EO 1.0
Commercial oleylsarcosinate in the acid form 2.0
Polymer of 70% acrylic acid and 30% maleic acid, Na salt, molecular weight 70000 4.0
carboxymethylcellulose 0.5
Water to 100
Washing:
Detergent: detergent A
Amount: 5.0 g/l
Amount of liquor: 250 g
Water temperature: 60° C.
Water hardness: 14.50 German hardness
Ca/Mg ratio: 4.0:1.0
Washing time: 30 min

TABLE 4

Results of tests on color transfer inhibition and reduction in the loss of color with Direct Blue 71 on cotton

|  | Polymer | Amount in detergent A [%] | Loss of color [%] | Color transfer inhibition [%] |
|---|---|---|---|---|
| Ex. |  |  |  |  |
| 4 | Polymer 4 | 1 | 16.2 | 99.6 |
| 5 | Polymer 5 | 1 | 12.7 | 98.2 |
| Comparative Example |  |  |  |  |
| 4 | none | — | 9.6 | 0 |
| 5 | VI/VP[1) copolymer | 1 | 20.9 | 99.3 |

[1)]VI/VP = 1-Vinylimidazole/1-vinylpyrrolidone

The results with polymers 4 and 5 to be used according to the invention show that the polymers have, with detergent A with a low anionic surfactant content, a very good color transfer-inhibiting effect and, furthermore, have distinctly less of a color-removing effect than the non-quaternized VI/VP copolymer with a molecular weight of 10000.

We claim:
1. A process for inhibiting dye removal and color transfer from colored textiles during the aftertreatment of and/or washing process for these textiles, which comprises adding to laundry aftertreatment aids and/or to detergents a polymer which consists of:

(a) 5 to 100 mol % of quaternized 1-vinylimidazole units represented by formula (I):

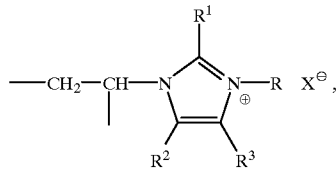

(I)

wherein
R is $C_1$–$C_{25}$-alkyl, $C_5$–$C_{10}$-cycloalkyl or benzyl,
$R^1$, $R^2$, $R^3$ are identical or different and are H, $CH_3$ or $C_2H_5$, and
$X^\ominus$ is an anion, (b) 0 to 75 mol % of 1-vinylpyrrolidone, vinyloxazolidone, N-vinylcaprolactam, N-vinylamides of $C_1$–$C_8$-carboxylic acids, vinyl esters of $C_1$–$C_{10}$-carboxylic, acids, acrylic esters and methacrylic esters of $C_1$–$C_{20}$-alcohols or mixtures of said monomers as copolymerized units, and (c) 0 to 30 mol % of other monoethylenically unsaturated monomers selected from the group consisting of acrylic acid, methacrylic acid, fumaric acid, maleic acid, maleic anhydride, itaconic acid, itaconic anhydride, hydroxyethyl acrylate, hydroxyethyl methacrylate, hydroxypropyl acrylate, hydroxypropyl methacrylate, hydroxybutyl acrylate, hydroxybutyl methacrylate, phenoxyethyl acrylate, and methoxyethyl acrylate as copolymerized units.

2. A process as claimed in claim 1, wherein the polymer consists of at least 10 mol % of quaternized 1-vinylimidazole units represented by formula I and have molecular weights of from 5000 to 1 million.

3. A process as claimed in claim 1, wherein the polymer consists of from 20 to 100 mol % of quaternized 1-vinylimidazole units represented by formula I and have molecular weights of from 10000 to 500000.

4. A process as claimed in claim 1, wherein the polymer consists of units represented by formula I wherein $R^1$, $R^2$, $R^3$=H and R is methyl, ethyl or benzyl.

5. A process as claimed in claim 1, wherein the polymer consists of quaternized vinylimidazole units represented by formula I in amounts of from 0.05 to 2.5% by weight in detergents which comprise less than 4% by weight of an anionic surfactant.

6. A process as claimed in claim 1, wherein the polymer consists of quaternized vinylimidazole units represented by formula I in detergents containing no anionic surfactants.

7. A process as claimed in claim 1, wherein the polymer consists of units of the formula I where $R^1$, $R^2$, $R^3$=H and R is $C_1$–$C_{25}$-alkyl or benzyl and X is an anion.

8. A process as claimed in claim 1, wherein the polymer consists of units of the formula I where $R^1$, $R^2$, $R^3$=H and R is $C_4$–$C_{22}$-alkyl or benzyl and X is an anion.

9. A process as claimed in claim 1, wherein the polymer is obtained by free-radical polymerization of (a) 5 to 100 mol % quaternary 1-vinylimidazoles represented by formula (II):

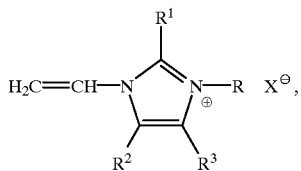

(II)

wherein
R is $C_1$–$C_{25}$-alkyl, $C_5$–$C_{10}$-cycloalkyl or benzyl,
$R^1$,$R^2$,$R^3$ are identical or different and are H, $CH_3$ and $C_2H_5$, and
$X^\ominus$ is an anion, (b) 0 to 75 mol % of 1-vinylpyrrolidone, vinyloxazolidone, N-vinylcaprolactam, N-vinylamides of $C_1$–$C_8$-carboxylic acids, vinyl esters of $C_1$–$C_{10}$-carboxylic acids, acrylic esters and methacrylic esters of $C_1$–$C_{20}$-alcohols or mixtures of said monomers, and (c) 0 to 30 mol % of other monoethylenically unsaturated monomers selected from the group consisting of acrylic acid, methacrylic acid, fumaric acid, maleic acid, maleic anhydride, itaconic acid, itaconic anhydride, hydroxyethyl acrylate, hydroxyethyl methacrylate, hydroxypropyl acrylate, hydroxypropyl methacrylate, hydroxybutyl acrylate, hydroxybutyl methacrylate, phenoxyethyl acrylate, and methoxyethyl acrylate, or by quaternization of polymers which consist of (a) 5 to 100 mol % 1-vinylimidazole units represented by formula (III):

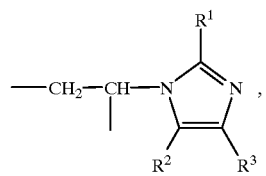

(III)

wherein $R^1$, $R^2$, $R^3$ are identical or different and are H, $CH_3$ and $C_2H_5$, with $C_1$–$C_{25}$-alkylating agents, and (b) 0 to 75 mol % of 1-vinylpyrrolidone, vinyloxazolidone, N-vinylcaprolactam, N-vinylamides of $C_1$–$C_8$-carboxylic acids, vinyl esters of $C_1$–$C_{10}$-carboxylic acids, acrylic esters and methacrylic esters of $C_1$–$C_{20}$-alcohols or mixtures of said monomers, and (c) 0 to 30 mol % of other monoethylenically unsaturated monomers selected from the group consisting of acrylic acid, methacrylic acid, fumaric acid, maleic acid, maleic anhydride, itaconic acid, itaconic anhydride, hydroxyethyl acrylate, hydroxyethyl methacrylate, hydroxypropyl acrylate, hydroxypropyl methacrylate, hydroxybutyl acrylate, hydroxybutyl methacrylate, phenoxyethyl acrylate, and methoxyethyl acrylate as copolymerized units.

10. A process as claimed in claim 1, wherein the polymer is a quaternized homopolymer of 1-vinyl imidazole.

11. A process as claimed in claim 1, wherein the polymer is a quaternized copolymer of 1-vinylimidazole and 1-vinylpyrrolidone.

* * * * *